United States Patent [19]

Bennett et al.

[11] 3,721,578

[45] March 20, 1973

[54] PLASTICIZED SULFUR, BITUMINOUS OR ASPHALT IMPREGNATED FABRIC

[75] Inventors: Richard J. Bennett; Rector P. Louthan, both of Bartlesville, Okla.

[73] Assignee: Phillips Petroleum Company, Bartlesville, Okla.

[22] Filed: Sept. 24, 1970

[21] Appl. No.: 75,262

Related U.S. Application Data

[62] Division of Ser. No. 720,368, April 10, 1968, Pat. No. 3,619,258.

[52] U.S. Cl. ............... 117/92, 161/237, 106/287, 106/19
[51] Int. Cl. ................. D06n 7/00, B32b 11/00
[58] Field of Search ... 161/236, 237; 260/24; 117/92, 117/121, 126, 138; 106/19, 287 S, 273

[56] References Cited

UNITED STATES PATENTS

| | | | |
|---|---|---|---|
| 2,367,587 | 1/1945 | Knapp | 117/92 |
| 2,801,937 | 8/1957 | Hess | 117/92 |
| 3,020,252 | 2/1962 | Hancock | 106/287 S |
| 3,316,115 | 4/1967 | Barnes | 106/287 S |
| 3,421,911 | 1/1969 | Greco et al. | 106/287 S |
| 3,434,852 | 3/1969 | Louthan | 106/19 |
| 3,447,941 | 6/1969 | Kane | 106/287 SC |
| 3,453,125 | 7/1969 | Williams | 106/19 |
| 3,466,179 | 9/1969 | Greco | 106/19 |
| 3,619,258 | 11/1971 | Bennett et al. | 117/121 |

*Primary Examiner*—Morris Sussman
*Attorney*—Young and Quigg

[57] ABSTRACT

A fabric is asphalt or bitumen coated and then adhesively coated at least on one side with plasticized sulfur. Bitumens including asphalt and asphalt emulsions now available are applicable. Hot melt application which can be followed immediately by the plasticized sulfur is possible. The product, which is flexible, solvent, weather resistant and light reflecting, and can be used for water-proofing as in roofing, road liners, pond and ditch liners, as wrapping material, it can be packaged as in rolls for marking stripes on tennis courts, athletic fields. Also, it can be used as pipe wrap, tank cladding and for decorative purposes.

2 Claims, No Drawings

PLASTICIZED SULFUR, BITUMINOUS OR ASPHALT IMPREGNATED FABRIC

This application is a divisional of Ser. No. 720,368, filed Apr. 10, 1968, issued as U.S. Pat. No. 3,619,258 on Nov. 9, 1971.

This invention relates to a novel composition or laminate of materials. In one of its aspects it relates to a laminate including a flexible base or fabric. In another of its aspects it relates to a water-proof, light reflecting, flexible material which can be used for roofing, road liners, pond and ditch liners, as weather resistant coating, a wrapping material, highway marker and which can be rolled for later un-rolling and use as in marking stripes as on tennis courts and other athletic areas, pipe wrap, tank cladding etc.

In one of its concepts the invention provides a flexible base material or fabric impregnated with a bituminous material or composition such as an asphalt or asphalt emulsion, impregnated base being coated on at least one side with a plasticized sulfur or plasticized sulfur composition. In another of its concepts the invention provides a method for producing a flexible, weather-proof, solvent resistant, light reflecting, composition or laminate by impregnating a base material with a bituminous or asphaltic material or composition or emulsion as herein disclosed and then applying to the impregnated base a plasticized sulfur or plasticized sulfur composition.

"Plasticized Sulfur Compositions for Traffic Markings" are disclosed in Industrial and Engineering Chemistry, 46, pages 2431 – 2435, November, 1954. The article disclosed utilization of plasticized sulfur for highway paints. Southwest Research Institute Report number 3—Part I, Project 1092-2, June 30, 1963 discloses a list of pigments including diatomaceous earth, calcium carbonate, etc., for use in plasticized sulfur paints for highways. U.S. Pat. No. 3,020,252 issued in 1962, Hancock, discloses utilization of plasticized sulfur paint for highways. The paint can include pigments.

We have now conceived that a flexible composition or laminate as herein described can be prepared by first impregnating a base having properties of bases herein described and then suitably coating the impregnated base with a plasticized sulfur.

It is an object of this invention to provide a new composition of matter. It is also an object of this invention to provide a new laminate. Further, it is an object of this invention to provide a flexible composition or laminate which can be used as a solvent, weather resistant coating, wrapping material, roofing, lining, stripe marker, tank cladding and other uses disclosed herein or evident herefrom.

Other aspects, objects and concepts of the invention are apparent from this disclosure and the appended claims.

According to the present invention, there is provided a bitumen or asphalt impregnated fabric or base having a coating of plasticized sulfur thereon.

Herein and in the claims the terminology "bitumen," "bituminous," "asphaltic," and "asphalt" is intended to refer to materials having the properties of bituminous or asphaltic or asphalt-like materials which can be or have been used for impregnating a base material.

Base materials which are available and which can be effectively utilized are woven and non-woven plastics such as polyvinyls, polyolefins, nylon and the like.

Specifically, woven or non-woven plastic polyolefin fabric or fabric blends comprising polyolefins or composed of other plastics which can be or have been made into fabrics whether woven or non-woven, can be used. A particularly suitable and now preferred fabric is one which is non-woven polypropylene known in the trade as "Loktuft."

"Loktuft" is a non-woven fabric of polypropylene fibers and is available from Revonah Spinning Mills, Trenton and Castor Avenues, Philadelphia, Pa., 19134. "Loktuft" is available in rolls of about 6 feet width and lengths of about 200 to 300 lineal feet. "Loktuft" has a weight of about 4 to 6 ounces per square yard, a tensile strength in the "warp" direction of 80–90 pounds and tensile strength in the fill or woof direction of about 90–100 pounds. "Loktuft," we have found, will hold up to about 4 times as much asphalt material as will burlap mats, cotton fibers, woven cloth, etc.

The preferred film now is polyethylene since the combination of it with the above-described fabric has yielded desirable results.

Further, other materials such as uncoated Kraft paper, felt, fiberglas, cotton, burlap and the like can also be used as base material.

It is a teacher of the invention that the plasticized sulfur coated onto the impregnated base forms a highly adhesive composition or laminate. The adhesive qualities are extant even after considerable bending or distortion. Even after partial destruction of the continuity of the plasticized sulfur coating upon the asphalt impregnated fabric the plasticized sulfur remains very ruggedly attached to the impregnated base.

The impregnation of the base material can be accomplished by hot melt application of the bituminous composition or asphaltic material or composition by direct application. That is, according to the invention the base can be brought together with hot melted impregnating agent or composition. The impregnating material or composition can be applied by various techniques now known in the art. For example, the base can be passed through the molten composition. The molten composition can be sprayed onto or upon the base from one or both sides thereof. Further, the bituminous or asphaltic composition can be prepared as an emulsion and the base dipped into the emulsion or the emulsion sprayed thereonto at least from one side thereof. When hot melt application is used, as for asphalt, plasticized sulfur can be applied immediately after the first coat. When an asphalt or asphaltic emulsion is used it is now preferred to give it time to break and for the water to be removed before the sulfur coating is applied. One skilled in the art in possession of this disclosure having studied the same will understand that depending upon the temperature of application water resulting from the asphalt emulsion may not have to be removed for certain applications. The vaporization of water form the asphalt impregnated base can be relied upon for some uses to produce a decorative effect by creating blow-holes or similar variations in the surface of the plasticized sulfur coating.

The asphalts used for the impregnation of the base include any of those bituminous materials used heretofore and known in the prior art, such as natural asphalts or those derived from petroleum refining, for example by steam refining and/or air blowing, and the like.

Asphalts characterized by penetrations (ASTM D–5–51) from 0 to about 300 or even higher and preferably from about 40 to 300 and having softening points (ASTM D–36–26) in the range of 90° to 250° F. and preferably 100° to 150° F., represent suitable asphalts that can be employed.

The relative amounts of the various components of the asphalt emulsion can vary but in general the asphalt is present in an amount in the range of 50 to 70, preferably 60 to 65 weight per cent; the emulsifier is present in an amount in the range of 0.1 to 4, preferably 0.25 to 1; and water is present in the amount between 50 and 25, preferably 32–39 weight per cent based on the total blend.

The asphalt emulsions employed can be prepared by any method known to those skilled in the art, for example, by preparing a soap solution comprising water, either soft or hard, and an emulsifying agent, either cationic, anionic, or nonionic. The soap solution is then mixed in a colloid mill or the like with the asphalt phase, the latter being preferably heated to reduce the viscosity. Usually the emulsifiers and any modifiers or promoters are dispersed in the water to form a soap solution which is then warmed to a temperature of 90° to 200° F., preferably 90° to 125° F. The asphalt can be heated to a temperature in the range of 150° to 350° F., preferably 250° to 300° F. The warm soap solution and hot asphalt are then proportioned to a colloid mill to emulsify the mixture during which milling the temperature of the mixture can be in the range of 100° to 210° F., preferably 150° to 200° F. The completed emulsion is then cooled to a temperature below 150° F. before being used or transferred to storage. The method of preparing an emulsion will have some effect on the properties thereof and the intended application or utility of the emulsion will dictate which particular method one should use to get the desired properties.

Fibers of polyolefins, particularly finely divided fibers of polymers of mono-1-olefins having from two to eight carbon atoms per molecule, preferably polymers of ethylene or propylene including both homopolymers and copolymers, which can be mixed with asbestos, as described, and impregnated with or coated with an asphalt emulsion such as hereinbefore described. In addition, the emulsion or blend of emulsion and asbestos fibers can be applied to a cloth or mat made from fibers that have been previously woven or matted into a cloth or a structure resembling same to form a structure. The water in the emulsion is then removed by any suitable method such as air drying or drying in an oven or by the heat employed in the molding operation.

The emulsifying agents employed to prepare the asphalt emulsion may be cationic, anionic or nonionic or combinations thereof.

A particularly useful class of cation emulsifying agents are salts of organic bases characterized by the presence of at least one basic nitrogen atom in the cation portion and where the latter contains a long chain aliphatic hydrocarbon radical of at least 12 and as many as 24 carbon atoms, preferably a straight chain fatty aliphatic group. A particularly useful subclass of such cationic emulsifying agents are the tetra-substituted quaternary ammonium compounds such as those of the formula:

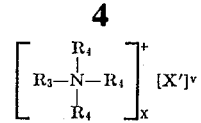

where $R_3$ is a long alkyl chain of at least 12 and as many as 24 carbon atoms, and the $R_4$'s are shorter alkyl radicals or benzyl radicals, the presence of which is sufficient to impart oil solubility and emulsifying properties to the salt material, $X'$ is a hydroxyl or an anion such as nitrate, sulfate, secondary phosphate, acetate, benzoate, salicylate and preferably a halogen, such as chlorine or bromine, $v$ is the valence of said hydroxyl or anion, and $x$ is an integer equal to said valence. Another particularly useful subclass of cationic emulsifying agents is the salts of heterocyclic nitrogen bases, such as alkyl pyridine, alkyl quinoline, alkylisoquinoline and alkyl imidazoline, a particularly useful group of the latter being represented by the general formula:

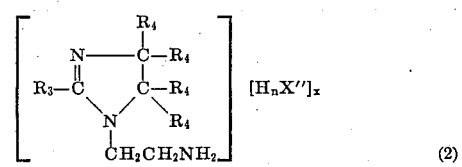

where $R_3$ is an aliphatic radical selected from the group consisting of alkyl and alkenyl radicals, preferably having 12 to 24 carbon atoms, $R_4$ is selected from the group consisting of hydrogen and alkyl radicals, preferably having one to four carbon atoms, and $X''$ is an anion such as nitrate, sulfate, secondary phosphate, acetate, benzoate, salicylate and preferably a halogen, such as chlorine and bromine, $n$ is an integer equal to the valence of the anion and $x$ is an integer of 1 to 3. Primary, secondary and tertiary mono-amines and diamines are also useful, particularly the fatty acid diamines of the general formula $R_3NH(CH_2)_mNH_2$, where $R_3$ is as defined above in formula (2) and $m$ is an integer in the range of 1 to 3.

Representative cationic emulsifying agents which can be used in this invention include cetyltrimethylammonium bromide, cetyldimethylammonium bromide, "tallow" trimethylammonium chloride (the term "tallow" referring to the radical of a mixture of fatty acids derived from tallow), n-dodecyltrimethylammonium chloride, n-dodecyltrimethylammonium bromide, n-dodecyltriethylammonium hydroxide, n-tetradecyltrimethylammonium chloride, n-hexadecyltripropylammonium iodide, n-octadecyltri-n-butylammonium nitrate, n-octadecyltriethylammonium chloride, n-hexadecyltrimethylammonium chloride, n-eicosyltrimethylammonium chloride, n-tetracosyltrimethylammonium acetate, n-pentadecylethyldimethylammonium chloride, n-docosylpropyldimethylammonium chloride, n-tricosyl-n-decyldiethylammonium benzoate, n-tetradecyl-n-heptyldimethylammonium chloride, n-octadecyl-n-decyldimethylammonium chloride, n-heptadecyldipropylmethylammonium chloride, n-nona-decyl-di-n-octylmethylammonium chloride, n-hexadecylethyldimethylammonium chloride, n-dodecylbenzyldimethylammonium chloride, n-pentadecylbenzyldiethylammonium fluoride, n-octadecylpropyldimethylammonium salicylate, n-dodecyl-n-butylbenzylmethylammonium bromide, n-nonadecyldiethylmethylammonium sulphate, n-eicosyltrimethylammonium orthophosphate, 1-(2-aminoethyl)-2(4-tetradecenyl)-4,5-di-n-butyl-2-imidazoline, 1-(2-aminoethyl)-2(1,1-diethyl-5,7-dodecadienyl)-4,5-dimethyl-2 -imidazoline, 1-(2-aminoethyl)-2-n-octadecyl-4-ethyl-2-imidazoline, 1-(2-aminoethyl)-2-n-eicosyl-2-imidazoline, 1-(2-aminoethyl)-2-(1,1-dimethyldecyl)-2-imidazoline, 1-(2-aminoethyl)-2-(12-heptadocenyl)-2-imidazoline, 1-(2-aminoethyl)-2-(5,7-heptadecadienyl)-2-imidazoline, and the like, including mixtures thereof.

There are a number of commercially available cationic emulsifying agents which can be used, including: Nalcamine G–39M, which is a mixture of 1(2-aminoethyl)-2-n-aliphatic-2-imidazolines where the aliphatic groups are heptadecenyl and heptadecadienyl; Hyamine 1622, octylphenoxyethoxyethyldimethyl benzylammonium chloride; Hyamine 2389, methyldodecylbenzyltrimethylammonium chloride; Hyamine 10-X, octylcresoxyethoxyethyldimethylbenzylammonium chloride; Nalquate G–8–12, 1-(2-oxyethyl)-2-n-alkyl-1 (or 3) - benzyl-2-imidazolinium chlorides; Diam 11–C (n-alkyl-1,3-propylene amines); Aliquat 26 nonotallowtrimethylammonium chloride; Alamine 26, primary tallow amine; Duomeen T, N-alkyltrimethylenediamine; and the like. In addition, an acid, such as hydrochloric acid, sulfuric acid, acetic acid or sulfamic acid, can be incorporated into the asphalt emulsion to enhance the surface active properties of the cationic emulsifying agent and impart an acid pH below 7 to the emulsion. Generally, pH's in the range of 2 to about 6.5, preferably 3 to 5, are suitable for these acidic emulsions. The amount of the acid will generally be 0.1 to 1, preferably 0.2 to 1, weight percent of the emulsion, but can be considered and calculated as part of the cationic emulsifying agent. Sulfamic acid is especially useful where the asphalt used is of an aromatic nature and has an oil fraction which has an A.P.I. gravity not exceeding 15.5, and preferably not exceeding 15, and is useful where the asphalt emulsion must pass the modified miscibility test or the cement mixing test, which are described hereinafter.

Suitable nonionic emulsifying agents include those of the general formula:

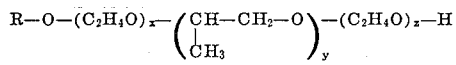

where R is selected from the group consisting of hydrogen, aryl, and alkylaryl radicals; and $x$, $y$ and $z$ are integers, such that (1) when $x$ is zero, $y$ is also zero, $z$ is in the range of six to 11, inclusive, and said R is one of said aryl and alkylaryl radicals, and (2) when $x$ and $y$ are each greater than zero, the sum of $x$ and $z$ is in the range of 20 to 40, inclusive, and $y$ is in the range of 40 to 60, inclusive.

Representative examples of the nonionic emulsifying agents include: phenoxypenta(ethyleneoxy)ethanol, phenoxyocta(ethyleneoxy)ethanol, phenoxyennea(ethyleneoxy)ethanol, phenoxydeca(ethyleneoxy)ethanol, 4-methylphenoxypenta(ethyleneoxy)ethanol, 2,3,6-triethylphenoxyhepta(ethyleneoxy)ethanol, 4(1,1,3,3-tetramethylbutyl)phenoxyhepta(ethyleneoxy)ethanol, 4(1,3,5-trimethylhexyl)phenoxyhexa(ethyleneoxy)ethanol, 4-nonylphenoxyhepta(ethyleneoxy)ethanol, 2,3,4,5,6-penta-n-pentylphenoxyennea(ethyleneoxy)ethanol, 2(1,3,5-trimethylhexyl)-4(1,3-dimethylbutyl)phenoxypenta(ethyleneoxy)ethanol, 4(3,5,5-trimethylheptyl)phenoxyhexa(ethyleneoxy)ethanol, 3(3,5,7,7-trimethyl-5-ethylnonyl)phenoxyhepta(ethyleneoxy)ethanol, 4(1,1,3,3,5,5,7,7-octamethyldecyl)phenoxyennea(ethyleneoxy)ethanol, 4-n-pentacosylphenoxypenta(ethyleneoxy)ethanol, 3,5-di-n-decyl-4-n-pentylphenoxydeca(ethyleneoxy)ethanol, beta-hydroxyethyleneoxytetraconta(propyleneoxy)octadeca(ethyleneoxy)ethanol, beta-hydroxyethoxyoctadeca(ethyleneoxy)tetracontra(propyleneoxy)ethanol, beta-hydroxyethoxyennea(ethyleneoxy)pentaconta(propyleneoxy)deca(ethyleneoxy)ethanol, betahydroxyethoxynonadeca(ethyleneoxy)hexaconta(propyleneoxy)nonadeca(ethyleneoxy)ethanol, beta-hydroxyethoxytetradeca(ethyleneoxy)pentatetraconta(propyleneoxy)tetradeca(ethyleneoxy)ethanol, phenoxyethyleneoxypentapentaconta(propyleneoxy)octatriaconta(ethyleneoxy)ethanol, 4-methylphenoxydeca(ethyleneoxy)nonatetraconta(propyleneoxy)eicosa(ethyleneoxy)ethanol, 4(1,3,5-trimethylhexyl)-phenoxyhexa(ethyleneoxy)pentacontra(propyleneoxy)triconta(ethyleneoxy)ethanol, 4-n-pentacosylphenoxypentacosa(ethyleneoxy)pentaconta(propyleneoxy)deca-(ethyleneoxy)ethanol, 2,4,5-trimethylphenoxydeca(ethyleneoxy)pentaconta(propyleneoxy)pentacosa(ethyleneoxy)ethanol, 2(1,3,5-trimethylhexyl)-4,(1,1,3,3-tetramethylbutyl)-phenoxyeicosa(ethyleneoxy)hexatetraconta(propyleneoxy)penta(ethyleneoxy)ethanol, 4-n-pentacosylphenoxyeicosa(ethyleneoxy)hexaconta(propyleneoxy)-nonatriaconta(ethyleneoxy)ethanol, and the like, and mixtures thereof.

In addition, other nonionic emulsified agents may be used including (a) those of the general formula:

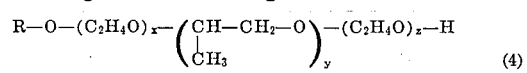

where R is selected from the group consisting of hydrogen, aryl and alkaryl radicals; and $x$, $y$, and $z$ are integers such that (1) when $x$ is zero, $y$ is also zero, $z$ is in the range of 20 to 60, and R is one of said aryl and alkaryl radicals, and (2) when $x$ and $y$ are each greater than zero, the sums of $x$ and $z$ is in the range of 50 to 350, and $y$ is in the range of 40 to 60; together with (b) a smaller proportion of a cationic emulsifying agent exemplified by the tetra-substituted quaternary ammonium compounds or the salts of heterocyclic nitrogen bases, and (c) naphtha.

The nonionic emulsifying agents as shown by the general formula, represent a rather narrow class of compounds and they have a critical balance of hydrophobic component (the R and propyleneoxy groups) and hydrophilic component (ethyleneoxy groups) necessary to give the necessary mixing time. Within the general formula given earlier for these nonionic emulsifying agents, there are two preferred subclasses that can be presented by the following general formula:

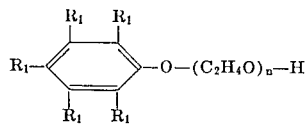

where $R_1$ is selected from the group consisting of hydrogen and alkyl radicals having one to 25 carbon atoms, the total number of carbon atoms in the alkyl radicals preferably does not exceed 25, and $n$ is an integer in the range of 20 to 60; and

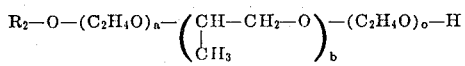

where $a$ and $c$ are integers greater than zero and whose sum is in the range of 50 to 350, $b$ is an integer in the range of 40 to 60, and $R_2$ is selected from the group consisting of hydrogen and the hydrocarbon radical:

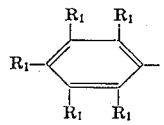

where $R_1$ is as defined above.

A particularly preferred nonionic emulsifier is Triton X-305, which is a mixture of octaphenoxypoly(ethyleneoxy)ethanol having 30 ethyleneoxy groups in the poly(ethyleneoxy) chain.

A particularly suitable combination comprises a mixture of nonionic and cationic emulsifying agents, particularly when asphalt emulsions are employed which exhibit lack of stability in the presence of siliceous aggregates.

Suitable anionic emulsifying agents employed include the sulfonates, particularly the alkyl aryl sulfonates, such as: p-dodecylbenzene sodium sulfate, n- or iso-p-octylphenoxypoly(ethyleneoxy)ethanol sodium sulfonates, sodium isopropylnaphthalene sulfonate, sodium tetrahydronaphthalene sulfonate and methylnaphthalene sodium sulfonate (Petro Ag); and the sulfates: sodium cetyl sulfate (n-hexadecylsodiumsulfate), ammonium lauryl sulfate, sodium tridecyl sulfate; and the phosphates: alkylpolyphosphates, complex amido-phospho salts, as well as esters and others such as: sodium diamyl sulfosuccinate and disodium-N-octadecyl sulfosuccinamate.

Although not essential, other materials may be employed in the asphalt emulsion, including such stabilizing agents as hydroxyethylcellulose, aluminum chloride, and calcium chloride.

The amount of asphalt or asphaltic material used to impregnate the base can be varied depending upon results desired. If the base is to be water impermeable and the base material or fabric is quite permeable, more asphalt or like material will, of course, be used. It is within the contemplation of the invention to prepare completely liquid impervious compositions and laminates from which liquids will not pass. It is also within the contemplation of the invention to prepare water repellent but pervious compositions or laminates. For example, impregnation of a base such as "Loktuft" can be accomplished to provide a water repellent but water permeable base. Application of the plasticized sulfur to such a base can be so accomplished that the plasticized sulfur flows down into the interstices and even through the interstices of the base. When this is done, specks of plasticized sulfur will show through on the non-plasticized sulfur coated side giving a decorative effect. When the base material, which has been impregnated with the asphaltic material is liquid pervious, it can be dipped or otherwise treated on both sides with a plasticized sulfur to provide a unitary mass in which the sulfur extends as a continuant from one side thereof to the other.

Generally, the amount of asphalt used will be in the range of from about 10 to 85 weight percent of base material weight. This is an approximation as one skilled in the art having studied this disclosure will understand. Different base materials will have different weights and different asphalt occluding properties. Further, different effects as above discussed are desirably obtained and can be reached by applying varying quantities of the asphaltic material thus by mere routine testing determining the optimum proportion desired. Presently it is preferred that the asphaltic material be from about 25 to about 75 weight percent based on the impregnated base composition. Lower amounts in the ranges given will normally be employed for cloth impregnation and the higher amounts for finely divided fiber or mat impregnation.

The total thickness of the single ply laminate may vary greatly depending of the thickness of the original mat and the thickness of the coating of plasticized sulfur applied thereto. Thus, the thickness may vary from 10–100 or more mils for the single ply and several such plies may be combined, as demonstrated in the subsequent Example III to make a product of almost any desired thickness.

When the finished product of the invention is to be used for laying into a soft but hardenable freshly laid surface, it will not require sometimes the same high tensile strength of the base material as may be required for other applications. Thus, it is with contemplation of the invention to apply the asphalt material to subdivided fibers or a matting of them and then to coat the product thus produced with the plasticized sulfur.

Any suitably plasticized sulfur composition containing only sulfur and plasticizer but which may contain additionally fillers, pigment, dyes, fibers, and the like, including asbestos, can be used. A now particularly preferred plasticized sulfur composition possessing desirable properties is one produced according to application for Pat. Ser. No. 488,723, filed Sept. 20, 1965 by Rector P. Louthan now U.S. Pat. No. 3,434,852, issued on Mar. 25, 1969. The disclosure of said application is incorporated herein by reference. In that application, plasticized sulfur compositions are produced by a reaction of certain polythiols with elemental sulfur thermally or in the presence of a basic catalyst. Polythiols are those having the formula $X(SH)_n$, where $n$ is an integer selected from the group consisting of 2, 3 and 4, preferably 2 or 3, and Y is a radical having a valence of $n$ and containing two to 30, preferably two to 20, carbon atoms, each of said carbon atoms preferably having attached thereto not more than one SH group, said radical Y being selected from the group consisting of (A) radicals containing carbon and hydrogen only, (B) radicals containing carbon, hydrogen, and oxygen only, and (C) radicals containing carbon, hydrogen, and sulfur only, the sulfur being present as monosulfide linkages. Radicals containing carbon and hydrogen only include saturated aliphatic, unsaturated aliphatic, saturated cycloaliphatic, unsaturated cycloaliphatic, and aromatic radicals, and combinations thereof. Radicals containing carbon, hydrogen, and oxygen only include saturated aliphatic, unsaturated aliphatic, saturated cycloaliphatic, unsaturated cycloaliphatic, and aromatic radicals, and combinations thereof. Radicals containing carbon, hydrogen, and oxygen only include saturated aliphatic, unsaturated aliphatic, saturated cycloaliphatic, and unsaturated cycloaliphatic radicals and aromatic radicals, and combinations thereof, possessing hydroxy, ester, aldehydic, or ketonic substitutents, or ether linkages, the total number of said substituents and linkages preferably not exceeding two. Radicals containing carbon, hydrogen, and sulfur only, the sulfur being present as sulfide linkages, include saturated and unsaturated hydrocarbyl radicals in which one or more methylene groups not adjacent to the thiol groups in the molecule are replaced by monosulfide linkages, said monosulfide linkages being separated by at least one carbon atom when more than one monosulfide linkage is present, and the number of said monosulfide linkages preferably not exceeding 10. Such compositions are distinguishable over those heretofore known in the art in that the polythiol is free from polysulfide linkages and the major portion of the sulfur remains in elemental form rather than being chemically bonded within the organic polymer molecule.

The plasticized sulfur compositions possess even more desirable properties if prepared through use of a trithiol or tetrathiol, preferably a trithiol, in combination with a dithiol. The use of a mixture of a dithiol and a trithiol or tetrathiol results in plasticized sulfur compositions whose properties are quite different from those expected on the basis of the properties of compositions prepared through use of the polythiols individually.

The plasticized sulfur compositions used according to the present invention can be readily molded or cast and may contain various extender fillers, such as fibers of glass, metal and asbestos, or pigments, such as calcium carbonate, calcium sulfate, magnesium silicate, magnesium carbonate, magnesium oxide, china clay, pyrophyllite, mica pumice, bentonite, silica, diatomite, barium sulfate, barium carbonate, alumina hydrate, calcium silicate and titanium dioxide. Halogenated polyphenols can be incorporated. Generally, the additives described in the above-mentioned application for patent are applicable for use in the plasticized sulfur portion of the composition or laminate of the present invention.

EXAMPLE I

A plasticized sulfur composition was prepared by heating 1 Kg. crude ethylcyclohexanedithiol and 750 g. sulfur at 340° F. (170° C.) for 4 hours. To this melt were added 3.350 Kg. additional sulfur.

A non-woven polypropylene fabric ("Loktuft") was impregnated with a 75 percent cationic asphalt emulsion. After drying, a 15 mil coating of the plasticized sulfur composition was applied by spraying from heat spraying equipment.

EXAMPLE II

Using the same formulation of plasticized sulfur, a similar 15 mil coating was spray applied to an asphalt impregnated glass mat (Glasfab, made by Twinsburg-Miller Corporation, Twinsburg, Ohio). The mat is being used as a highway marker.

EXAMPLE III

A plasticized sulfur composition was prepared as in Example I except that a mixture of 80 percent by weight of ethylcyclohexane dithiol and 20 percent by weight of propane trithiol was used.

A non-woven polypropylene fabric was impregnated with a 75 percent cationic emulsion. After drying a 20 mil coating of the plasticized sulfur composition of this example was applied as in Example I. Four layers of this laminate were placed in a heated tile mold and cured at 250° F. and an applied pressure of 200 psi. A stiff, impact resistant tile suitable for use as flooring was produced.

The olefins from which polymers, copolymers or blends can be prepared for use as at least a part of the base material or fabric are 1-olefins having from two to eight carbon atoms. Now preferred are those polymers and copolymers or blends which are produced according to the process of U. S. Pat. No. 2,825,721 issued Mar. 4, 1958, John Paul Hogan and R. L. Banks. The disclosure of said patent is incorporated herein by reference. However, other polymers which may be made by different processes from the same or different olefins or olefinic materials are included within the scope of the present invention and the appended claims thereto. Suffice to say that base material or fabric need merely have the properties which permit suitable impregnation and yield upon completion of the article, composition or laminate the desired properties as herein set forth.

It is within the scope of the present invention to overlay a base or fabric upon a backing and to then apply the impregnating bituminous material or asphalt followed by the coating of the plasticized sulfur selected. Such a base material if flexible will be protected suitably by the composition of the invention because the composition of the invention can be prepared to be quite flexible.

It is within the scope of the present invention to place the composition of the invention into a mold and to therein more or less permanently mold the same to fit a certain pattern or shape.

Reasonable variation and modification are possible within the scope of the foregoing disclosure and the appended claims to the invention the essence of which is that there has been provided a novel composition or laminate comprising a base material or fabric impregnated with asphalt or asphalt-like material and coated on at least one side with a plasticized sulfur or plasticized sulfur composition, substantially as set forth and described.

We claim:

1. A flexible laminate comprising a flexible fibrous base or fabric impregnated with asphalt and then coated with a ruggedly adhering coating or layer of plasticized sulfur.

2. A flexible molded and shaped article comprising a flexible fibrous impregnated and coated base according to claim 1.

* * * * *